US006313616B1

(12) United States Patent
Deller et al.

(10) Patent No.: US 6,313,616 B1
(45) Date of Patent: Nov. 6, 2001

(54) SWITCHING BUCK CONVERTER WITH FLOATING REGULATOR

(75) Inventors: Robert W. Deller, Santa Clarita; Robert C. Heagey, Acton, both of CA (US)

(73) Assignee: Home Touch Lighting Systems LLC, Salt Lake City, UT (US)

( * ) Notice: Subject to any disclaimer, the term of this patent is extended or adjusted under 35 U.S.C. 154(b) by 0 days.

(21) Appl. No.: 09/667,148

(22) Filed: Sep. 21, 2000

(51) Int. Cl.[7] ........................................... G05F 1/575
(52) U.S. Cl. ............................................ 323/282
(58) Field of Search ............................. 323/282; 363/89

(56) References Cited

U.S. PATENT DOCUMENTS

| 3,733,540 | * | 5/1973 | Hawkins ................... 363/89 |
| 4,030,024 | * | 6/1977 | Chambers et al. . |
| 4,293,904 | * | 10/1981 | Brooks et al. ............ 323/282 |
| 4,644,254 | * | 2/1987 | Panse ...................... 323/282 |
| 4,816,982 | * | 3/1989 | Severinsky ............... 363/89 |
| 5,336,985 | * | 8/1994 | McKinzie ................ 323/282 |
| 6,023,037 | * | 2/2000 | Church et al. ............ 363/89 |

* cited by examiner

Primary Examiner—Jeffrey Sterrett
(74) Attorney, Agent, or Firm—Fulbright & Jaworski L.L.P.

(57) ABSTRACT

A PWM switching power supply of the buck regulator type converts an unfiltered rectified d.c. input voltage into a regulated stepped down d.c. output voltage for use by load circuits. The power supply includes a PWM switching regulator which controls the duty cycle of an N-channel field effect transistor (FET) power switch which has its source connected to a Schottky flyback diode. The flyback diode is connected to an LC output filter which generates the stepped down output voltage. The PWM regulator includes a 555 timer operating in conjunction with an RC timing network in a modulated a stable mode. Timer 555 has an output lead electrically connected to the gate of the FET for switching the FET on/off in response to an output voltage modulating feedback input from a feedback path with the source of the FET serving as the "ground" for the PWM regulator. The feedback path includes a diode connected in series to a sampling capacitor which supplies a sampled output voltage feedback via a voltage divider and another diode to the 555 timer to allow the regulator circuit to fly with the FET power switch. When the FET is conductive, current flows through the LC output filter charging the capacitor and generating the stepped down d.c. output voltage. When the FET is non-conductive, the current loop is through the flyback diode. A smoothing filter is electrically connected to the FET power switch to smooth the unfiltered rectified d.c. input voltage.

23 Claims, 4 Drawing Sheets

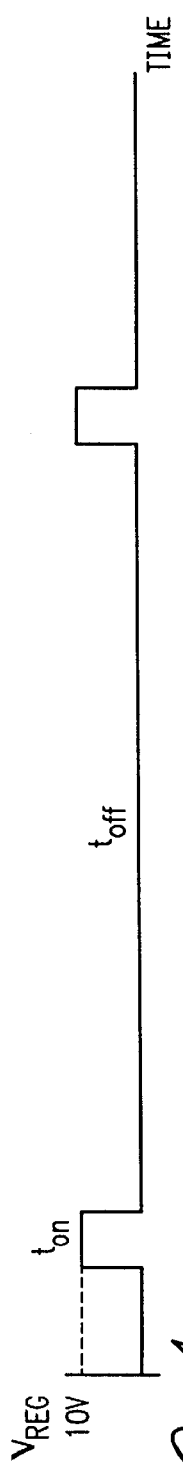
FIG. 4a
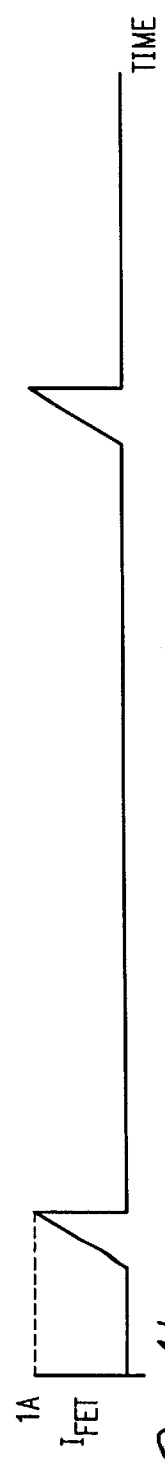
FIG. 4b
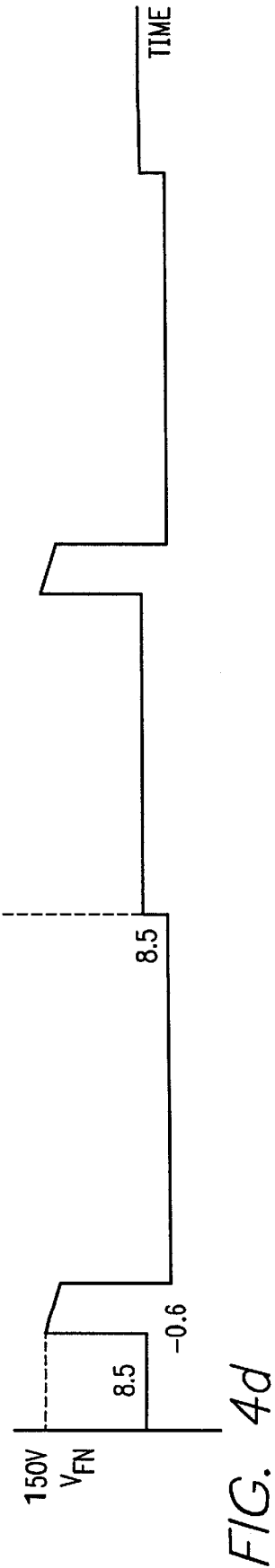
FIG. 4c
FIG. 4d

SWITCHING BUCK CONVERTER WITH FLOATING REGULATOR

BACKGROUND OF THE INVENTION

1. Field of the Invention

The present invention relates generally to switching power supplies and more particularly to switching power supplies of the floating regulator type.

2. Prior Art

A switching power supply is used to convert an unregulated direct current (d.c.) input into a regulated d.c. output. Modern power supplies of this type may include a power switch (transistor), a diode clamp, a filter and a regulator. The regulator may include an oscillator and a duty cycle controller and is used to control the power switch. The regulator typically is connected to the filter via a feedback path which helps keep the output d.c. voltage at a constant value regardless of variations in the load by sampling the voltage output and feeding the sampled voltage back into the regulator for duty cycle control. The duty cycle of the switching transistor determines the average d.c. voltage output with the duty cycle being proportional to the ratio of the output d.c. voltage to the input d.c. voltage. Switching is usually done at a constant frequency just above the audible range, although some regulators use a variable frequency with changing line and load. With some switching regulators, it is possible to change the switching frequency with an external capacitor. Higher frequencies in general are less efficient since transistor switching losses and ferrite-core losses increase. On the other hand, lower switching frequencies in the audible range may cause some components to "sing" and/or produce interference in certain external circuits powered by the regulator. A fast-recovery rectifier, or a Schottky barrier flyback diode, is usually used as a free-wheeling diode clamp to keep the switching transistor load line within safe operating parameters and to increase overall efficiency. The power switching transistor needs to have a breakdown voltage rating greater than the input voltage, since at start-up the transistor sees the entire d.c. input voltage.

Switching power supplies can provide regulated outputs that are greater or smaller than the input, as desired. When the output voltage is greater than the input voltage, the power supply also referred to as a d.c.-d.c. converter is called a step-up (or boost) converter. Alternatively, a step-down (or buck) converter has an input voltage greater than its output voltage. The conversion in this case may be from a high-voltage unregulated input to a low-voltage regulated output.

Switching regulators can also be classified as to how they control the d.c. output voltage. Two conventional approaches are pulse width modulation (PWM) and pulse frequency modulation (PFM). Both approaches control the output voltage by varying the duty cycle. The PWM regulator operates by chopping the d.c. input voltage into pulses whose amplitude is the magnitude of the input voltage and whose duty cycle is controlled by a control circuit in the regulator in response to a sampled output voltage feedback.

Conventional PWM switching power supplies exhibit a number of problems such as high RFI emissions, complex circuit design, inefficient operation and audible noise during operation. Various designs have been proposed to overcome some or all of the above problems, none successfully. For example, U.S. Pat. No. 4,030,024 to Chambers et al discloses a flyback type of preregulator power supply having circuitry which is floating alternately from the input and output leads to accomplish direct coupling to a power switching regulator. The output choke has an added series winding which is connected to the output of the switching regulator and forms the return lead for the floating drive and control circuits. The complex circuit includes two standard 555 timers, a control operational amplifier, two transistors, a potentiometer and other components. The added series winding on the output choke may contribute to an increase in acoustic noise during operation of the power supply. This setup employs complex circuitry which raises the cost of the power supply In other known switching power supplies, the power switch is typically a P-channel device in which case a complex circuit is needed to level shift the output of the regulating circuit up or down depending on whether a step-up or step-down converter is needed. This adds to the overall cost of the device and results in inefficient operation. In these devices, the regulator is usually connected to circuit ground.

Therefore, the need arises for an improved PWM switching power supply which operates efficiently and has simplified circuit architecture which may include a greatly reduced number of inexpensive off-the-shelf electronic components such as an inexpensive 555 timer, an N-channel MOSFET, an output filter and a flyback Schottky diode. Such an improved switching power supply should also preferably employ a PWM regulator which floats with the switching transistor rather than being connected to circuit ground. Such a power supply should preferably be a "quiet" power supply, that is, it should be designed in such a way as to reduce the audible noise emitted by conventional switching power supplies.

SUMMARY OF THE INVENTION

The present invention is directed to a switching power supply for converting an unfiltered rectified direct current (d.c.) input voltage into a regulated d.c. output voltage. The switching power supply comprises a smoothing filter for receiving the unfiltered rectified d.c. input voltage and generating a smoothed d.c. input voltage signal, a power switch operatively coupled to the smoothing filter and having a conductive state and a non-conductive state, a regulator operatively coupled to the power switch for driving the power switch at a pre-selected duty cycle to transform the smoothed d.c. input voltage signal into a pulsed d.c. input voltage signal in accordance with the pre-selected duty cycle, the regulator floating with the power switch instead of being connected to circuit ground, an output filter operatively coupled to the power switch for receiving the pulsed d.c. input voltage signal and generating a d.c. output voltage signal for use by at least one load, the duty cycle being generally proportional to the ratio of the d.c. output voltage signal to the smoothed d.c. input voltage signal, a diode clamp operatively coupled between the power switch and the output filter for closing the current loop on the output filter when the power switch is in the non-conductive state, and a sampling circuit operatively coupled to the output filter for sampling the d.c. output voltage signal and feeding the sampled d.c. output voltage signal back to the regulator to regulate the d.c. output voltage signal.

In accordance with one aspect of the present invention, the smoothing filter comprises a choke inductor connected in series to a smoothing capacitor. The power switch comprises an N-channel field effect transistor (FET) having a source which serves as the "ground" of the regulator, a drain electrically coupled to the smoothing capacitor and a gate coupled to the regulator. The regulator controls the gate voltage of the FET.

In accordance with another aspect of the present invention, the regulator comprises an a stable circuit having an output lead electrically coupled to the gate of the FET for applying oscillatory voltage to the gate of the FET for transforming the smoothed d.c. input voltage signal applied to the drain of the FET into a pulsed d.c. input voltage signal in accordance with the preselected duty cycle. The regulator functions essentially as a pulse width modulation (PWM) regulator. The output filter comprises an inductor connected in series to an output capacitor with the inductor receiving the pulsed d.c. input voltage signal and the output capacitor generating the d.c. output voltage signal. The diode clamp comprises a Schottky flyback diode connected in parallel with the output filter. The flyback diode has an anode and a cathode electrically coupled between the source of the FET and the inductor of the output filter to define a fly back diode-switch-inductor node. The flyback diode closes the current loop on the output filter when the FET is in the non-conductive state.

In accordance with yet another aspect of the present invention, the sampling circuit comprises a first diode connected in series with a sampling capacitor for receiving the d.c. output voltage signal and generating a sampled d.c. output voltage feedback signal. The a stable circuit of the PWM regulator comprises a 555 timer, a resistor-capacitor (RC) network and a second diode, the 555 timer electrically coupled to the RC network and having threshold and trigger pins tied together and an out pin electrically coupled to the output lead of the a stable circuit with the 555 timer floating with the FET during operation. The RC network comprises a timing capacitor connected in series with a pair of series resistors, one of the pair of series resistors connected in parallel with the second diode.

In accordance with still another aspect of the present invention, the PWM regulator further comprises a feedback voltage circuit for receiving the sampled d.c. output voltage feedback signal from the sampling capacitor. The feedback circuit comprises a voltage divider, a feedback node, a third diode and a trigger/threshold node, the trigger/threshold node electrically coupled to the tied threshold and trigger pins of the 555 timer.

In accordance with a different aspect of the present invention, the novel switching power supply further comprises a power supply source. The power supply source comprises a capacitor connected in parallel to a Zener diode and a pair of series resistors electrically connected between the choke inductor and the Zener diode.

Other aspects of the present invention will become apparent from a review of the accompanying drawings and the following detailed description of the invention.

BRIEF DESCRIPTION OF THE DRAWINGS

FIG. 4a is a graph of a typical voltage output waveform from the PWM regulator of the present invention;

FIG. 4b is a graph of a typical waveform of the current through the N-channel FET of the present invention;

FIG. 4c is a graph of a typical waveform of the current through the inductor of the LC output filter of the present invention; and FIG. 4d is a graph of a typical operational voltage waveform at the flyback diode-switch-inductor node of the switching power supply in accordance with the present invention.

DETAILED DESCRIPTION OF THE PREFERRED EMBODIMENTS

Figure 1:
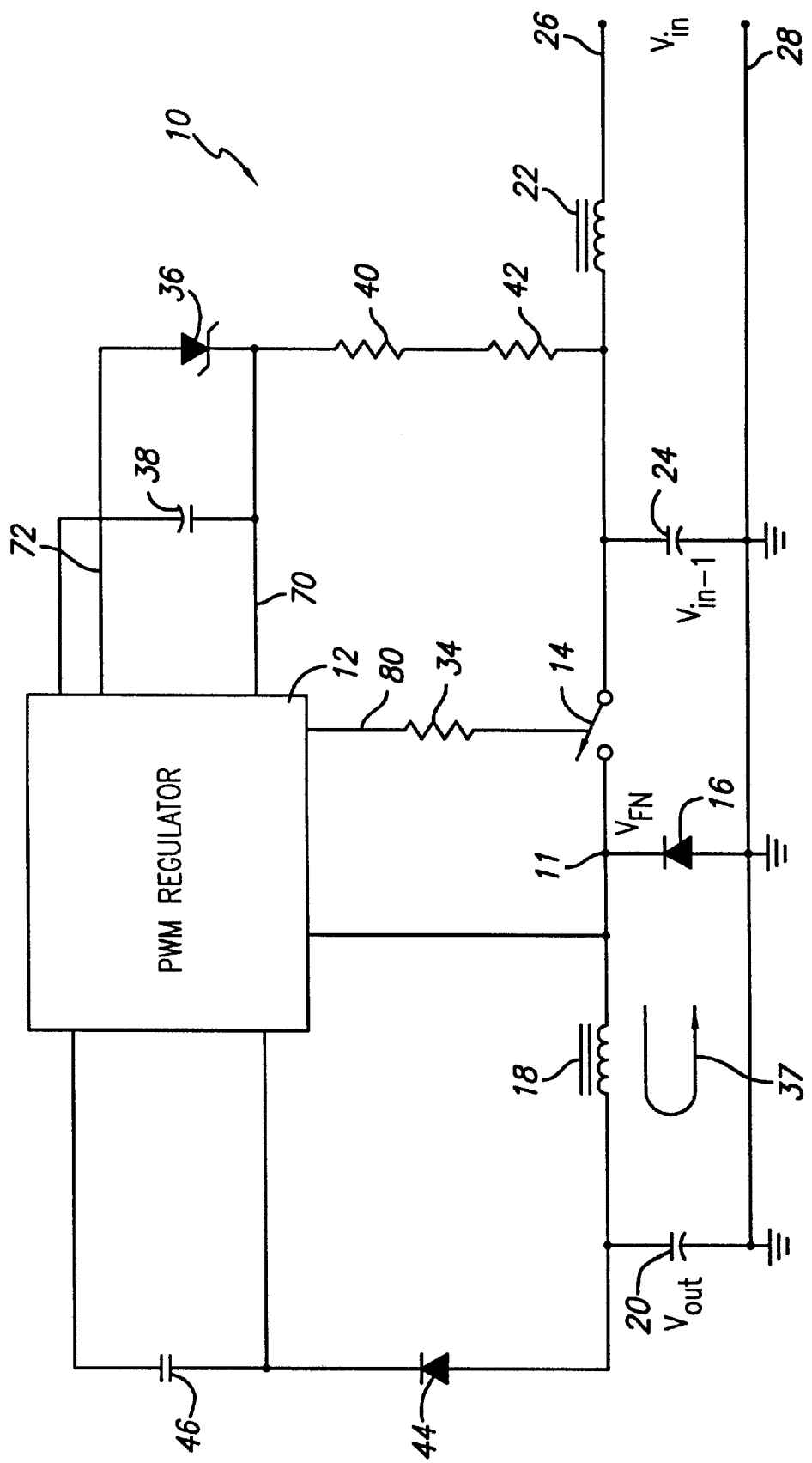
FIG. 1 is a simplified schematic drawing of a PWM switching power supply of the buck converter type in accordance with the present invention.

Hereinafter, some preferred embodiments of the present invention will be described in detail with reference to the related drawings of FIGS. 1–4d. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

The present invention relates to a PWM switching power supply which meets the above needs and is of the buck-regulator type in which an unregulated d.c. input voltage is stepped down to a regulated d.c. output voltage for use by a load. The circuit topology comprises a PWM regulator which controls the duty cycle of an N-channel field effect transistor (FET) power switch which is connected in series to a Schottky barrier diode clamp. The Schottky diode is connected in series to an LC output filter with the filter capacitor voltage being the stepped-down regulated d.c. output voltage of the PWM switching power supply. The source of the N-channel FET serves as the "ground" for the PWM regulator which is electrically connected to the gate of the FET via a resistor and floats with the FET during operation rather than being conventionally connected to circuit ground. The PWM regulator controls the gate voltage of the FET power switch, i.e. it turns the FET power switch on and off in response to a modulating power supply output voltage feedback from a feedback path which includes a sampling circuit to allow the PWM regulator to float with the FET power switch. The duty cycle of the PWM regulator is roughly proportional to the ratio of output d.c. voltage to input d.c. voltage. When the FET power switch is "on", current flows through the LC output filter charging the filter capacitor and generating a stepped-down d.c. output voltage. When the FET power switch is "off", the current path is through the Schottky diode and the feedback path to control switch actuation by the PWM regulator.

Figure 2:
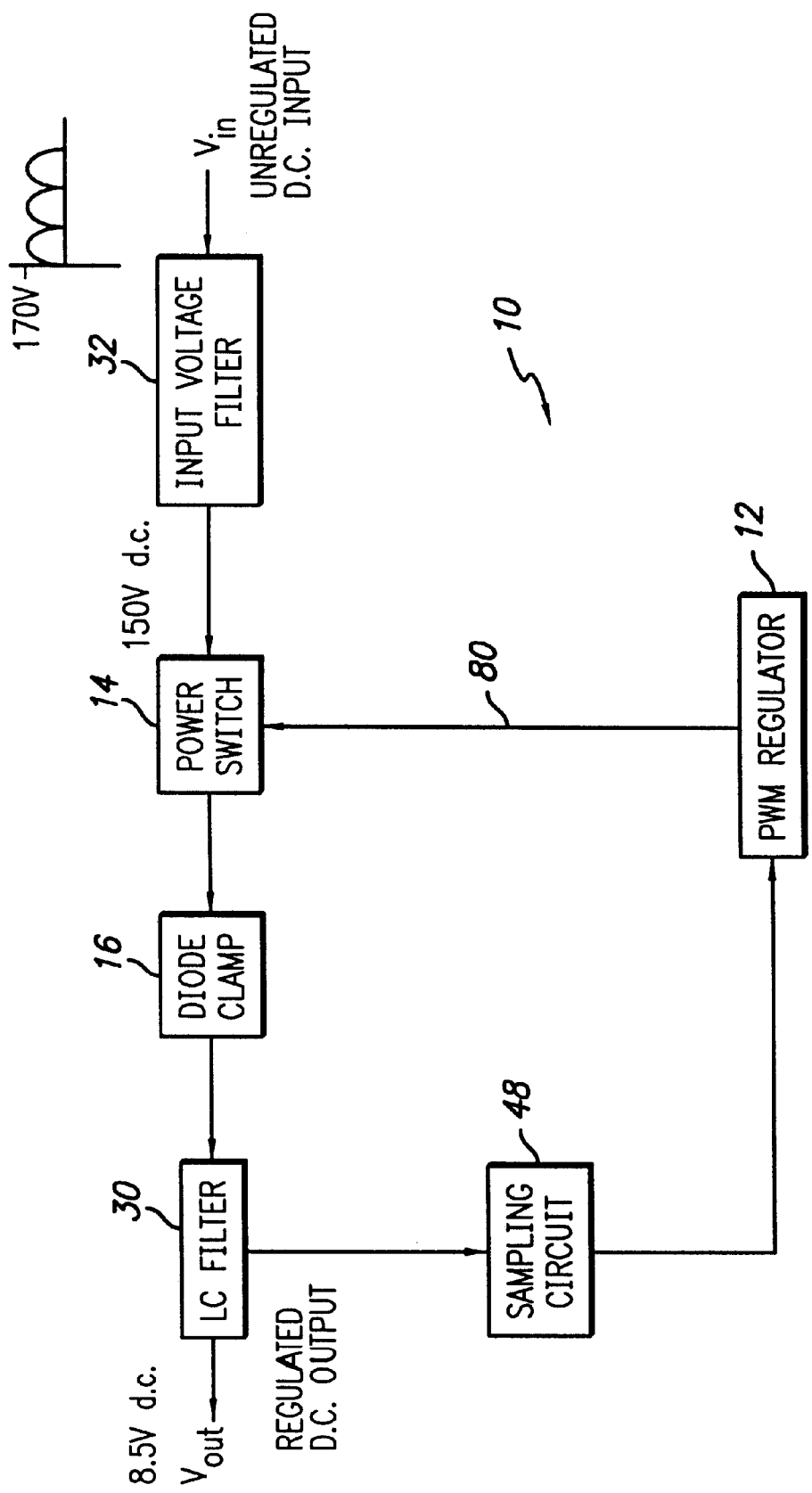
FIG. 2 is a block diagram of the circuit topology of the switching power supply of FIG. 1.
Figure 3:
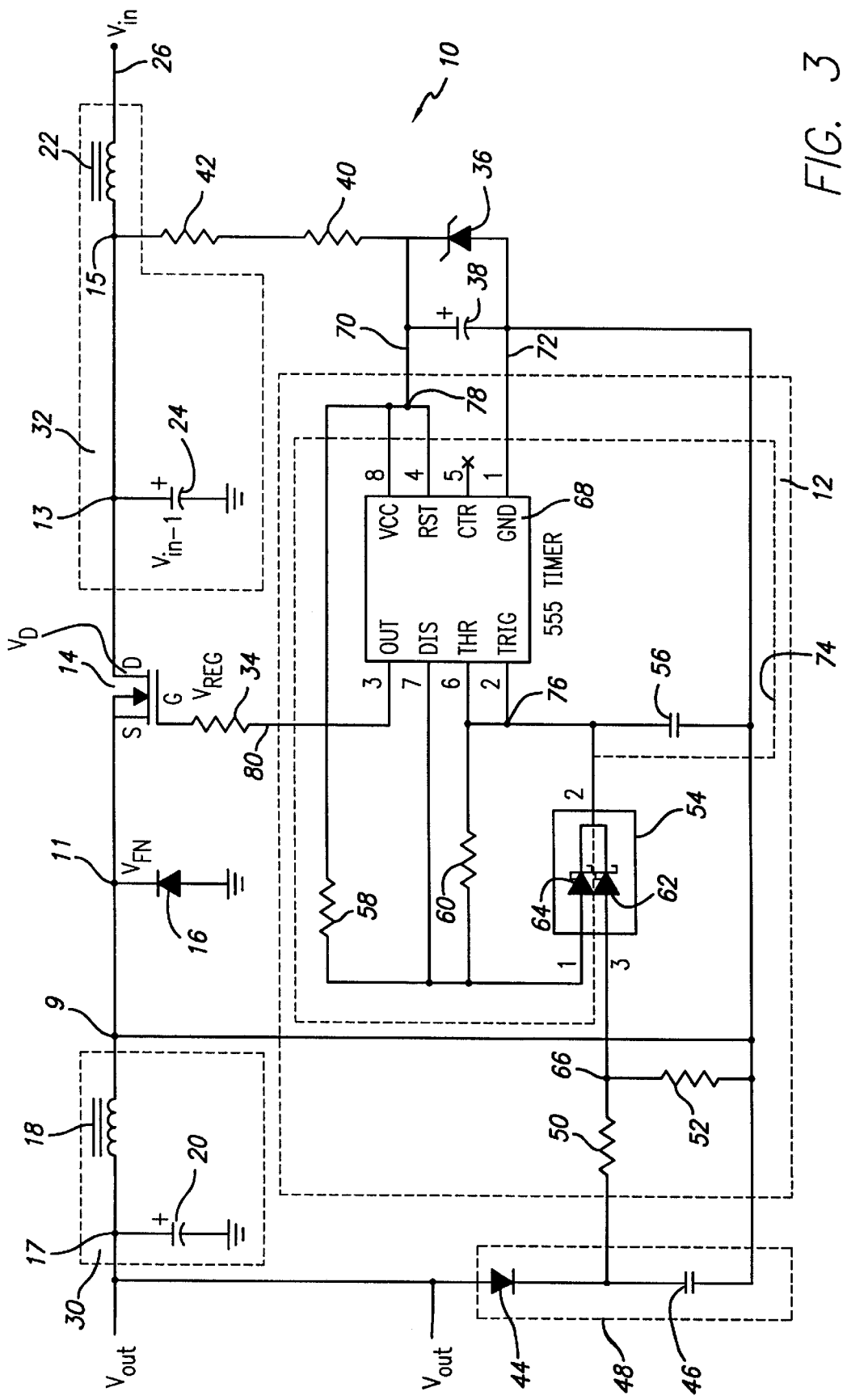
FIG. 3 is a schematic drawing of the switching power supply of FIG. 1.

Referring now more particularly to FIGS. 1–3, a switching power supply generally referred to by reference numeral 10 is shown for stepping down a high-voltage unregulated d.c. input to a low-voltage regulated d.c. output in accordance with the principles of the present invention. Input voltage $V_{in}$ may be a 170 V full-wave rectified unfiltered d.c. voltage (FIG. 2) applied across circuit terminals 26, 28 with circuit terminal 28 connected to ground (FIG. 1). The rectification of the a.c. input voltage may be done by a conventional bridge rectifier (not shown). Output voltage $V_{out}$ may be a regulated filtered 8.5 V d.c. voltage which can supply more than one load circuits as shown in FIG. 3.

As depicted in FIG. 1, power supply 10 comprises a PWM regulator 12 for controlling the duty cycle of a power switch 14 via output lead 80 and a resistor 34. Power switch 14, although shown as a mechanical switch in the simplified circuit of FIG. 1 is in reality an inexpensive N-channel field effect transistor (FET) which has a source S, a drain D and a gate G (FIG. 3). FET switch 14 may be a IRF 820 N-channel FET manufactured by International Rectifier of El Segundo, Calif. The architecture of PWM regulator 12 is shown (in dashed lines) in detail in FIG. 3.

As illustrated in FIG. 3, source S of FET 14 serves as the "ground" of PWM regulator 12, i.e. PWM regulator 12 is floating with the FET rather than being conventionally connected to circuit ground. PWM regulator 12 turns the FET power switch 14 on/off via output lead 80 and resistor 34 by applying a positive pulsed voltage to gate G of FET 14 controlling the duty cycle of FET 14.

As further illustrated in FIG. 3, source S of FET 14 is connected to the cathode terminal of a diode clamp 16 which may be a Schottky barrier diode for high-speed switching via a node 11 (FIG. 3). Schottky diode 16 is connected in parallel with a LC filter 30 (also shown in FIG. 2) which includes an inductor 18 connected in series with an output capacitor 20 with the voltage across capacitor 20 being the stepped-down regulated d.c. output voltage $V_{out}$ which as noted above may be 8.5 V d.c. Inductor 18 connects to diode 16 via a node 9 and to capacitor 20 via a node 17 (FIG. 3).

Drain D of FET power switch 14 is connected to an input smoothing filter 32 which includes an inductor 22 connected in series with a capacitor 24 (FIGS. 2–3). Specifically, drain D connects to capacitor 24 via a node 13 and capacitor 24 connects to inductor 22 via a node 15 (FIG. 3). LC filter 32 receives the 170 V full-wave rectified d.c. input voltage and filters (or smooths) the same to a 150 V d.c. output voltage $V_{in-1}$ (across capacitor 24) which has a certain amount of ripple and is also the drain voltage, i.e. $V_D=V_{in-1}$ (FIGS. 1, 3).

Referring to FIG. 3, PWM regulator 12 preferably comprises a standard 555 timer 68, a timing capacitor 56 connected in series to resistors 60 and 58, voltage divider resistors 50 and 52 and a diode chip 54 containing diodes 62 and 64. All components are inexpensive off-the-shelf components available for purchase at electronics supply stores nationwide. For example, diode chip 54 may be a BAT-54CCT manufactured by Vishay of Malvern, Pa., 555 timer 68 may be a LMC 555 timer manufactured by National Semiconductor of Santa Clara, Calif., etc. Alternative electronic components may be used provided that such components are suitable for the intended purpose of the present invention.

A standard 555 timer is an 8-pin IC chip usually used in conjunction with an external RC timing network. The chip receives supply voltage from an external power source and includes internally two voltage comparators, one ohmic ladder having three resistors, one bistable flip-flop and one discharging transistor (internal components not shown). The various pin designations are illustrated in FIG. 3. The ohmic ladder is used to set the comparator levels with all three resistors being of equal value. As a result, the threshold comparator is referenced internally at ⅔ of the supply voltage level while the trigger comparator is referenced at ⅓ of the supply voltage. The outputs from the comparators are tied to the bistable flip-flop. When the trigger voltage is moved below ⅓ of the supply voltage, the comparator changes state and sets the flip-flop driving the output to a high state. The threshold pin monitors the capacitor voltage of the RC timing network. When the capacitor voltage exceeds ⅔ of the voltage supply, the threshold comparator resets the flip-flop which in turn drives the output to a low state. When the output is at "low", the discharging transistor is "on" thereby discharging the external capacitor. The timer will then await another trigger pulse, the timing cycle having been completed.

As shown in FIGS. 1 and 3, 555 timer 68 is provided with a supply source represented by a capacitor 38 connected in parallel to a Zener diode 36. Capacitor 38 connects to timer pins 4, 8 (reset, $V_{cc}$) at node 78 via terminal 70 and to timer pin 1 (ground) via terminal 72. Capacitor 38 is charged via series resistors 42 and 40 (FIG. 3) with resistor 42 being connected between inductor 22 and capacitor 24 of LC filter 32 (FIG. 3).

The standard 555 timer can be used in an a stable (oscillatory) circuit configuration which would include three external components, namely, a timing capacitor connected in series to two resistors. Such oscillatory circuit will produce a duty cycle bigger than 50%. If a duty cycle less than 50% is desired, an additional external diode is connected in parallel to one of the resistors.

To produce an oscillatory waveform output, PWM regulator 12 utilizes a stable circuit 74 (shown in dashed lines in FIG. 3). Circuit 74 includes resistors 58 and 60 connected in series to a timing capacitor 56 which communicates with 555 timer 68 via timer trigger pin 2 which is tied conventionally to threshold pin 6. The operation of oscillatory circuit 74 in a stand-alone mode is as follows. At power-up, capacitor 56 is discharged holding the trigger low. This triggers the timer which establishes the capacitor charge path via resistors 58 and 60. When capacitor 56 reaches the threshold level of ⅔ $V_{cc}$, the output drops low and the discharging transistor is turned on. The timing capacitor 56 now discharges through resistor 60. When the capacitor voltage falls to ⅓ $V_{cc}$, the trigger comparator trips, automatically retriggering the timer, creating an oscillator. The timer is thus triggered repeatedly, giving a square output waveform at a certain frequency given by:

$f_{osc}=1.49/(R_{58}+2R_{60})C_{56}$ which is derived as follows.

The "high" time or charging interval is given by: $T_{high}=0.67(R_{58}+R_{60}) C_{56}$. The "low" time is given by: $T_{low}=0.67R_{60}C_{56}$. Since one time cycle or period is equal to $(T_{high}+T_{low})$, the frequency of oscillation $f_{osc}=1/(T_{high}+T_{low})=1/0.67(R_{58}+2R_{60}) C_{56}=1.49/(R_{58}+2R_{60})C_{56}$. The duty cycle is defined as $T_{high}/T_{low}$. Clearly, the duty cycle is independent of the supply voltage and varying the ratio of $R_{58}$ and $R_{60}$ varies the duty cycle. Furthermore, to reduce the duty cycle to less than 50%, i.e. to about 5%, a diode 64 is added to the a stable circuit. Diode 64 is part of diode chip 54 and connects in parallel to resistor 60 via diode pins 1 and 2. The duty cycle is now less than 50%, however, it is a fixed duty cycle (as is the frequency of oscillation). Since a switching power supply needs to provide a regulated (or constant—independent of load variations) voltage output and since the ratio of the output voltage to input voltage is proportional to the duty cycle, the only way that the output voltage can be kept constant in the face of a varying (rippling) input voltage is if the switching regulator is capable of varying the duty cycle according to the needs of the overall circuit.

To provide the above capability and in accordance with a preferred embodiment of the present invention, a modulating voltage feedback input is added to trigger/threshold node 76 of 555 timer 68 (FIG. 3). To establish the feedback, the output voltage from LC output filter 30 ($V_{out}$) is preferably sampled by a sampling circuit 48. Sampling circuit 48 comprises a diode 44 connected in series to a sampling capacitor 46 with the sampled output voltage fed into timer node 76 via the voltage divider (resistors 50 and 52), feedback node 66 and diode 62 (pins 3,2 of diode chip 54). The sampled output voltage feedback modulates (varies) the duty cycle of a stable circuit 74 to maintain the output d.c. voltage $V_{out}$ at a constant low-voltage level, e.g. the 8.5. V d.c. level mentioned hereinabove.

The internal operation of power supply 10 is analogous to a mechanical flywheel and a one-pistoned engine. Regulator 12 applies pulsed voltage to the gate G of FET 14 (FIG. 3) via resistor 34 chopping the smoothed 150 V d.c. input voltage into power pulses which are passed through LC filter 30. A typical pulsed voltage waveform of regulator 12, $V_{REG}$, is shown in FIG. 4a. In other words, regulator 12 serves as a driver turning on/off the FET power switch 14 to step down the output d.c voltage to a desired level. LC output filter 30, like the mechanical flywheel, stores energy between the power pulses of the driver (regulator 12) and averages the duty-cycle modulated input voltage waveform. The LC filtering function can be approximated as follows:

$V_{out} \approx$ (Duty Cycle)$V_{in-1}$–where $V_{in-1}$ is the smoothed (150 V) d.c. voltage across capacitor 24 and $V_{out}$ is the stepped down (8.5. V) d.c. power supply output voltage across capacitor 20.

When FET 14 conducts current in response to an "on" signal from PWM regulator 12, the current through the FET, $I_{FET}$, rises linearly upward (FIG. 4b) and the voltage at flyback diode-switchinductor node 11, $V_{FN}$, jumps to 150 V d.c. (FIG. 4d) which causes current through inductor 18, $I_L$ to ramp linearly upward charging capacitor 20. A typical inductor current ramp is shown in FIG. 4c and is given by:

$I_L(on) = (V_{FN} - V_{out}) t_{on}/L + I_{initial}$ where $I_{initial}$ is the initial current in inductor 18, if any, and $I_L(on)$ is the current in inductor 18 during the "on" period which is linear in time $t_{on}$, L is the inductance of inductor 18. As a result of the changing current through the inductor, inductor 18 stores energy which is given by:

$E_{stored} = \frac{1}{2} L (I_{peak} - I_{min})^2$

The energy is stored by the flux contained within the core material of inductor 18.

When FET switch 14 is non-conductive, i.e. no "on" signal from regulator 12 (FIG. 4a), the current through FET 14, $I_{FET}$, drops to zero (FIG. 4b). Schottky diode 16 then takes over conducting the current in current loop 37 (FIG. 1) which causes inductor 18 to dump its stored energy through diode 16. Some energy is discharged to the load (external circuits—not shown). The current through inductor 18, $I_L$, during this time is decreasing linearly as shown in FIG. 4c and is given by:

$I_L(off) = T_{high} - V_{out} t_{out}/L$ where the inductor current waveform is a negative linear ramp in time $t_{off}$ with a slope $-V_{out}/L$.

Clearly, the value of the duty cycle ($t_{on}/t_{off}$) would determine the magnitude of the stepped-down output voltage. A low duty cycle would correspond to a $t_{off}$ much longer than $t_{on}$. If the duty cycle is very low (and depending on load conditions), inductor 18 may run out of current. In such a case, the switching regulator is said to operate in a discontinuous mode. A continuous mode would apply when the current through inductor 18 never drops to zero during $t_{off}$. If the desired duty cycle is about 5%, or very low, inductor 18 does run out of current about half of the time during $t_{off}$ typically this is also a function of load and line voltage (FIG. 4c) Thus, $I_L$ fluctuates between $I_{peak}$ and $I_{min} = 0$ as generally shown in FIG. 4c. In any case, in either continuous or discontinuous mode, diode clamp 16 and output capacitor 20 are preferably picked to be capable of handling peak currents as well as average currents.

A person skilled in the art, would appreciate that the moment after FET14 stops conducting, the voltage at the flyback diode-switch-inductor node 11, $V_{FN}$, (FIG. 1) will pull down to –0.6 V as shown in FIG. 4d, or one forward diode drop, since the potential difference needed to cause conduction through the p-n junction of a silicon diode is 0.6 V. When $V_{FN}$ drops from 150 V to –0.6 V it takes the ground of the regulator circuit with it and the regulator circuit is locked to –0.6 V by flyback diode 16. The output voltage $V_{out}$, which is 8.5 V–(–0.6 V)=8.5 V+0.6 V, is then passed through sampling circuit 48 to allow PWM regulator 12 to float with FET power switch 14 instead of being connected to circuit ground as commonly practiced in the prior art. Sampling circuit 48 is part of the output voltage feedback path (FIG. 2) and includes forward biased diode 44 (FIG. 3), the two diode drops (for diode 16 and diode 44) cancel each other out and the output voltage that actually gets sampled via sampling capacitor 46 is the 8.5 V portion of the output voltage which is the output voltage that needs to be regulated.

Furthermore, in accordance with the best mode for practicing the invention, by the time $I_L$ has dropped to zero and there is no longer a forward conducting path through diode 16, the output voltage has been sampled and the only way that the sampled signal can drain off is via the voltage divider made up of resistors 50 and 52 (FIG. 3) which sets up the feedback ratio that will be fed back into timer 68. The actual feedback path is via feedback node 66, diode 62 (pins 3, 2 of diode chip 54) and timer trigger/threshold node 76. Thus, when inductor 18 runs out of current, $V_{FN}$ rises instantly from –0.6 V to 8.5 V and stays at that level for the remaining portion of $t_{off}$ (FIG. 4d). When FET 14 is turned on again by PWM regulator 12, $V_{FN}$ snaps back immediately up to the 150 V level (FIG. 4d) providing again high-voltage d.c. input to LC output filter 30 and the cycle continues.

In accordance with another preferred embodiment of the present invention, the voltage feedback at timer node 76 modifies the operation of a stable circuit 74 by varying (or modulating) the duty cycle of the gate voltage applied at gate G of FET 14 by timer 68 in accordance with the needs of the power supply circuit. Specifically, the higher the voltage across resistor 52 (which is the sampled output voltage feedback) becomes, the faster timing capacitor 56 will charge which lengthens $T_{low}$ and reduces the $T_{high}/T_{low}$ ratio (or duty cycle) of the output of timer 68 accordingly. As the sampled voltage across resistor 52 builds up to 8.5 V, which is the voltage level that needs to be regulated, the duty cycle of timer 68 falls respectively allowing accurate regulation of the output voltage. Reduction of the duty cycle reduces the ratio of output voltage to input voltage which constitutes in effect a closed negative feedback loop. Therefore, the introduction of a modulating feedback input at timer trigger/threshold node 76 has transformed the standard a stable circuit of 555 timer 68 into a PWM regulator circuit.

It should be recognized by those skilled in the art that regulation of the stepped-down d.c output voltage was accomplished without having to do complicated level shifting as practiced in the prior art and with a greatly reduced number of low cost off-the-shelf electronic components. It should also be recognized that the inventive PWM regulator may be replaced by any other PWM regulator as long as it serves the needs of the present invention.

Furthermore, it is anticipated that practicing the invention would result in a considerable spread (20–30 kHz) of the output frequency spectrum of 555 timer 68. A conventional switching regulator with a fixed d.c. input produces an output with a fixed frequency content. Standard switching power supplies using such conventional switching regulators are known to produce undesirable audible noise (buzzing) during operation. The buzzing is due to vibration of the inductor coils (in the LC output filter) which, unless solidly secured to the core by means of potting or the like, vibrate around the core when currents rapidly increase/decrease through them. Known power supplies of this type usually incorporate some means of dampening the audible noise with variable success. The switching power supply of the present invention reduces the audible noise considerably due to the spread in output frequencies from 555 timer 68. Instead of exciting the inductor at a fixed frequency, i.e. at 25 kHz, which would concentrate all the energy at that frequency and result in audible noise, PWM regulator 12 switches over a range of frequencies, e.g. 20–30 kHz. This has the effect of greatly reducing the amplitude at any one frequency and significantly reducing or even eliminating any audible noise and may also help improve conductive electromagnetic interference (EMI).

It should be appreciated by a person skilled in the art that other components and/or configurations may be utilized in the above-described embodiments, provided that such components and/or configurations do not depart from the intended purpose and scope of the present invention.

While the present invention has been described in detail with regards to the preferred embodiments, it should be appreciated that various modifications and variations may be made in the present invention without departing from the scope or spirit of the invention. In this regard it is important to note that practicing the invention is not limited to the applications described hereinabove. Many other applications and/or alterations may be utilized provided that they do not depart from the intended purpose of the present invention.

It should be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A switching power supply for converting an unfiltered rectified direct current (d.c.) input voltage into a regulated d.c. output voltage, said switching power supply comprising:
   (a) a smoothing filter for receiving said unfiltered rectified d.c. input voltage and generating a smoothed d.c. input voltage signal;
   (b) a power switch operatively coupled to said smoothing filter and having a conductive state and a non-conductive state;
   (c) a regulator operatively coupled to said power switch for driving said power switch at a pre-selected duty cycle to transform said smoothed d.c. input voltage signal into a pulsed d.c. input voltage signal in accordance with said pre-selected duty cycle, said regulator floating with said power switch instead of being connected to circuit ground;
   (d) an output filter operatively coupled to said power switch for receiving said pulsed d.c. input voltage signal and generating a d.c. output voltage signal for use by at least one load, said pre-selected duty cycle being generally proportional to the ratio of said d.c. output voltage signal to said smoothed d.c. input voltage signal;
   (e) a diode clamp operatively coupled between said power switch and said output filter for closing the current loop on said output filter when said power switch is in said non-conductive state; and
   (f) a sampling circuit operatively coupled to said output filter for sampling said d.c. output voltage signal and feeding said sampled d.c. output voltage signal back to said regulator to regulate said d.c. output voltage signal.

2. The switching power supply of claim 1, wherein said sampling circuit comprises a first diode connected in series with a sampling capacitor for receiving said d.c. output voltage signal and generating said sampled d.c. output voltage signal.

3. The switching power supply of claim 1, wherein said smoothing filter comprises a choke inductor connected in series to a smoothing capacitor.

4. The switching power supply of claim 3, wherein said power switch comprises an N-channel field effect transistor (FET) having a source which serves as the ground of said regulator, a drain coupled to said smoothing capacitor and a gate coupled to said regulator, said regulator controlling the gate voltage of said FET.

5. The switching power supply of claim 4, wherein said output filter comprises an inductor connected in series to an output capacitor, said inductor receiving said pulsed d.c. input voltage signal, said output capacitor generating said d.c. output voltage signal.

6. The switching power supply of claim 4, wherein said diode clamp comprises a Schottky flyback diode connected in parallel with said output filter, said flyback diode having an anode and a cathode coupled between said source of said FET and said inductor of said output filter to define a fly back diode-switch-inductor node.

7. The switching power supply of claim 4, wherein said regulator comprises an a stable circuit having an output lead coupled to said gate of said FET and applying oscillatory voltage to said gate for transforming said smoothed d.c. input voltage signal applied to said drain of said FET into said pulsed d.c. input voltage signal in accordance with said pre-selected duty cycle, said regulator functioning as a pulse width modulation (PWM) regulator.

8. The switching power supply of claim 7, wherein said a stable circuit of said PWM regulator comprises a 555 timer, a resistor-capacitor (RC) network and a second diode, said 555 timer electrically coupled to said RC network and having threshold and trigger pins tied together and an out pin electrically coupled to said output lead of said a stable circuit, said 555 timer floating with said FET during operation.

9. The switching power supply of claim 8, wherein said RC network comprises a timing capacitor connected in series with a pair of series resistors, one of said pair of series resistors connected in parallel with said second diode.

10. The switching power supply of claim 9, wherein said PWM regulator further comprises a feedback voltage circuit for receiving said sampled d.c. output voltage signal from said sampling capicitor.

11. The switching power supply of claim 10, wherein said feedback circuit comprises a voltage divider, a feedback node, a third diode and a trigger/threshold node, said trigger/threshold node electrically coupled to said tied threshold and trigger pins of said 555 timer.

12. The switching power supply of claim 11, further comprising a power supply source.

13. The switching power supply of claim 12, wherein said power supply source comprises a capacitor connected in parallel to a Zener diode and a pair of series resistors electrically connected between said choke inductor and said Zener diode.

14. A switching power supply for converting a smoothed direct current (d.c.) input voltage into a regulated d.c. output voltage, said switching power supply comprising:

(a) a power switch having a conductive state and a non-conductive state;

(b) a regulator operatively coupled to said power switch for driving said power switch at a pre-selected duty cycle, said regulator floating with said power switch instead of being connected to circuit ground;

(c) an output filter operatively coupled to said power switch for generating a d.c. output voltage for use by at least one load, said pre-selected duty cycle being generally proportional to the ratio of said d.c. output voltage to said smoothed d.c. input voltage;

(d) a diode clamp operatively coupled between said power switch and said output filter for closing the current loop on said output filter when said power switch is in said non-conductive state; and (e) a sampling circuit operatively coupled to said output filter for sampling said d.c. output voltage and feeding said sampled d.c. output voltage back to said regulator to regulate said d.c. output voltage.

15. The switching power supply of claim 14, wherein said sampling circuit comprises a first diode connected in series with a sampling capacitor for receiving said d.c. output voltage signal and generating said sampled d.c. output voltage.

16. The switching power supply of claim 14, wherein said power switch comprises an N-channel field effect transistor (FET) having a source which serves as the ground of said regulator, a drain and a gate coupled to said regulator, said regulator controlling the gate voltage of said FET.

17. The switching power supply of claim 16, wherein said diode clamp comprises a Schottky flyback diode connected in parallel with said output filter, said flyback diode having an anode and a cathode coupled between said source of said FET and said inductor of said output filter to define a flyback diode-switch-inductor node.

18. The switching power supply of claim 16, wherein said regulator comprises an a stable circuit having an output lead coupled to said gate of said FET and applying oscillatory voltage to said gate for transforming said smoothed d.c. input voltage into a pulsed d.c. input voltage in accordance with said pre-selected duty cycle, said regulator functioning as a pulse width modulation (PWM) regulator.

19. The switching power supply of claim 18, wherein said output filter comprises an inductor connected in series to an output capacitor, said inductor receiving said pulsed d.c. input voltage, said output capacitor generating said d.c. output voltage.

20. The switching power supply of claim 18, wherein said a stable circuit of said PWM regulator comprises a 555 timer, a resistor-capacitor (RC) network and a second diode, said 555 timer electrically coupled to said RC network and having threshold and trigger pins tied together and an out pin electrically coupled to said output lead of said a stable circuit, said 555 timer floating with said FET during operation.

21. The switching power supply of claim 18, wherein said PWM regulator further comprises a feedback voltage circuit for receiving said sampled d.c. output voltage from said sampling capacitor.

22. The switching power supply of claim 21, wherein said feedback voltage circuit comprises a voltage divider, a feedback node, a third diode and a trigger/threshold node, said trigger/threshold node electrically coupled to said tied threshold and trigger pins of said 555 timer.

23. The switching power supply of claim 22, further comprising a power supply source.

* * * * *